United States Patent
Homison et al.

(10) Patent No.: US 11,060,416 B2
(45) Date of Patent: Jul. 13, 2021

(54) SYSTEMS FOR A TURBOCHARGER

(71) Applicant: Transportation IP Holdings, LLC, Norwalk, CT (US)

(72) Inventors: Christopher Joseph Homison, Wattsburg, PA (US); Louis Kobielski, Sherman, NY (US); Daniel Edward Loringer, Erie, PA (US); Richard Scott, Greenville, SC (US); Lukas Johnson, Edinboro, PA (US); Jared Vaughn, Derry, NH (US); Raghav Kulkarni, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 211 days.

(21) Appl. No.: 16/264,174

(22) Filed: Jan. 31, 2019

(65) Prior Publication Data

US 2020/0248586 A1 Aug. 6, 2020

(51) Int. Cl.
*F01D 25/24* (2006.01)
*F01D 25/12* (2006.01)
(Continued)

(52) U.S. Cl.
CPC .............. *F01D 25/125* (2013.01); *B61C 5/00* (2013.01); *F01D 25/243* (2013.01); *F02C 6/12* (2013.01);
(Continued)

(58) Field of Classification Search
CPC ....... F01D 25/125; F01D 25/243; B61C 5/00; F02C 6/12; F16C 37/007; F16C 2326/10; F16C 2360/24; F05D 2220/40; F05D 2230/60; F05D 2240/14; F05D 2240/50; F05D 2260/20; F05D 2260/98
See application file for complete search history.

(56) References Cited

U.S. PATENT DOCUMENTS

| 2,660,399 A | 11/1953 | Robinson et al. |
| 3,173,241 A | 3/1965 | Birmann |

(Continued)

FOREIGN PATENT DOCUMENTS

| CN | 101415920 A | 4/2009 |
| CN | 201288603 Y | 8/2009 |

(Continued)

*Primary Examiner* — Justin D Seabe
*Assistant Examiner* — Theodore C Ribadeneyra
(74) *Attorney, Agent, or Firm* — McCoy Russell LLP

(57) ABSTRACT

Various methods and systems are provided for a radial turbocharger. In one example, the turbocharger comprises a turbine case housing a turbine wheel and a compressor case housing a compressor wheel, the turbine case including a vaneless turbine nozzle integrated into the turbine case, a bearing case surrounding a shaft connecting the turbine wheel to the compressor wheel and arranged between the turbine case and compressor case, a plurality of long bolts arranged around a circumference of the turbine case, and a plurality of slots arranged around a circumference of the turbine case, a slot length of each slot extending in a radial direction and adapted to receive a dowel pin having a diameter smaller than the slot length, where each dowel pin, via a corresponding slot, couples the bearing case to the turbine case.

19 Claims, 6 Drawing Sheets

(51) Int. Cl.
  *F02C 6/12* (2006.01)
  *B61C 5/00* (2006.01)
  *F16C 37/00* (2006.01)
(52) U.S. Cl.
  CPC ........ *F16C 37/007* (2013.01); *F05D 2220/40* (2013.01); *F05D 2230/60* (2013.01); *F05D 2240/14* (2013.01); *F05D 2240/50* (2013.01); *F05D 2260/20* (2013.01); *F05D 2260/98* (2013.01); *F16C 2326/10* (2013.01); *F16C 2360/24* (2013.01)

(56) References Cited

U.S. PATENT DOCUMENTS

| | | | |
|---|---|---|---|
| 4,068,612 A | 1/1978 | Meiners | |
| 4,171,936 A * | 10/1979 | Hageman | F02B 39/00 417/407 |
| 4,240,678 A * | 12/1980 | Sarle | F16C 33/10 384/369 |
| 4,382,747 A | 5/1983 | Okano | |
| 4,389,845 A | 6/1983 | Koike | |
| 4,655,043 A | 4/1987 | McInerney | |
| 5,026,260 A * | 6/1991 | Gutknecht | F01D 25/125 184/6.11 |
| 5,028,208 A * | 7/1991 | Mitsubori | F01D 17/165 415/150 |
| 5,092,126 A | 3/1992 | Yano | |
| 5,146,752 A | 9/1992 | Bruestle | |
| 5,161,960 A * | 11/1992 | Smith | F01D 25/125 184/6.11 |
| 6,073,447 A | 6/2000 | Kawakami et al. | |
| 6,364,634 B1 | 4/2002 | Svihla et al. | |
| 6,499,969 B1 | 12/2002 | Tombers et al. | |
| 9,657,596 B2 * | 5/2017 | Svihla | F01D 25/243 |
| 2010/0054934 A1 | 3/2010 | Böning et al. | |
| 2010/0189558 A1 * | 7/2010 | Boning | F01D 25/243 415/203 |
| 2011/0167817 A1 | 7/2011 | Sausse et al. | |
| 2012/0014782 A1 * | 1/2012 | Petitjean | F01D 25/18 415/170.1 |
| 2012/0237345 A1 * | 9/2012 | Uesugi | F02C 7/06 415/229 |
| 2012/0263589 A1 * | 10/2012 | Iwata | F16C 17/18 415/229 |
| 2014/0090375 A1 * | 4/2014 | Kanzaka | F02B 39/005 60/605.3 |
| 2015/0086395 A1 | 3/2015 | Dextraze et al. | |
| 2016/0363129 A1 | 12/2016 | Horsley | |
| 2020/0056504 A1 * | 2/2020 | Jungmann | F01D 25/14 |

FOREIGN PATENT DOCUMENTS

| | | | | |
|---|---|---|---|---|
| CN | 202707158 U | 1/2013 | | |
| CN | 203626939 U | 6/2014 | | |
| CN | 203742677 U | 7/2014 | | |
| CN | 106150557 A | 11/2016 | | |
| CN | 108229015 A | 6/2018 | | |
| DE | 102017108100 A1 * | 10/2018 | ........ | F01D 25/125 |
| JP | 2009002246 A | 1/2009 | | |
| WO | 2004046509 A1 | 6/2004 | | |

* cited by examiner

SYSTEMS FOR A TURBOCHARGER

BACKGROUND

Technical Field

Embodiments of the subject matter disclosed herein relate to a larger-frame radial turbocharger which may be used in an engine system.

Discussion of Art

Engine systems, such as engine systems of locomotives, may be equipped with a turbocharger, which may allow an engine to receive boost air during some engine operating parameters to increase power output and fuel efficiency. Turbochargers may be equipped with a variety of features to manage thermal stresses induced by hot exhaust gases, to manage containment in an event of turbine wheel degradation (e.g., burst), to support a shaft of the turbocharger, and to couple all components of the turbocharger to one another.

Based on a turbocharger size, some turbines may be equipped with heat shields and other features for mitigating heat transfer from the turbine to a bearing case or a compressor. For example, larger-frame turbochargers may include a heat shield and/or supplemental containment shield around the turbine of the turbocharger.

BRIEF DESCRIPTION

In one embodiment, a turbocharger includes a turbine case housing a turbine wheel and a compressor case housing a compressor wheel, the turbine case including a vaneless turbine nozzle integrated into the turbine case, a bearing case surrounding a shaft connecting the turbine wheel to the compressor wheel and arranged between the turbine case and compressor case, and a plurality of bolts or other fasteners arranged around a circumference of the turbine case, each bolt of the plurality of bolts extending parallel to the shaft and from an outer face of a compressor end of the bearing case, through the bearing case, and into the turbine case.

BRIEF DESCRIPTION OF THE DRAWINGS

FIGS. 2A-5 are shown approximately to scale.

DETAILED DESCRIPTION

Figure 1:
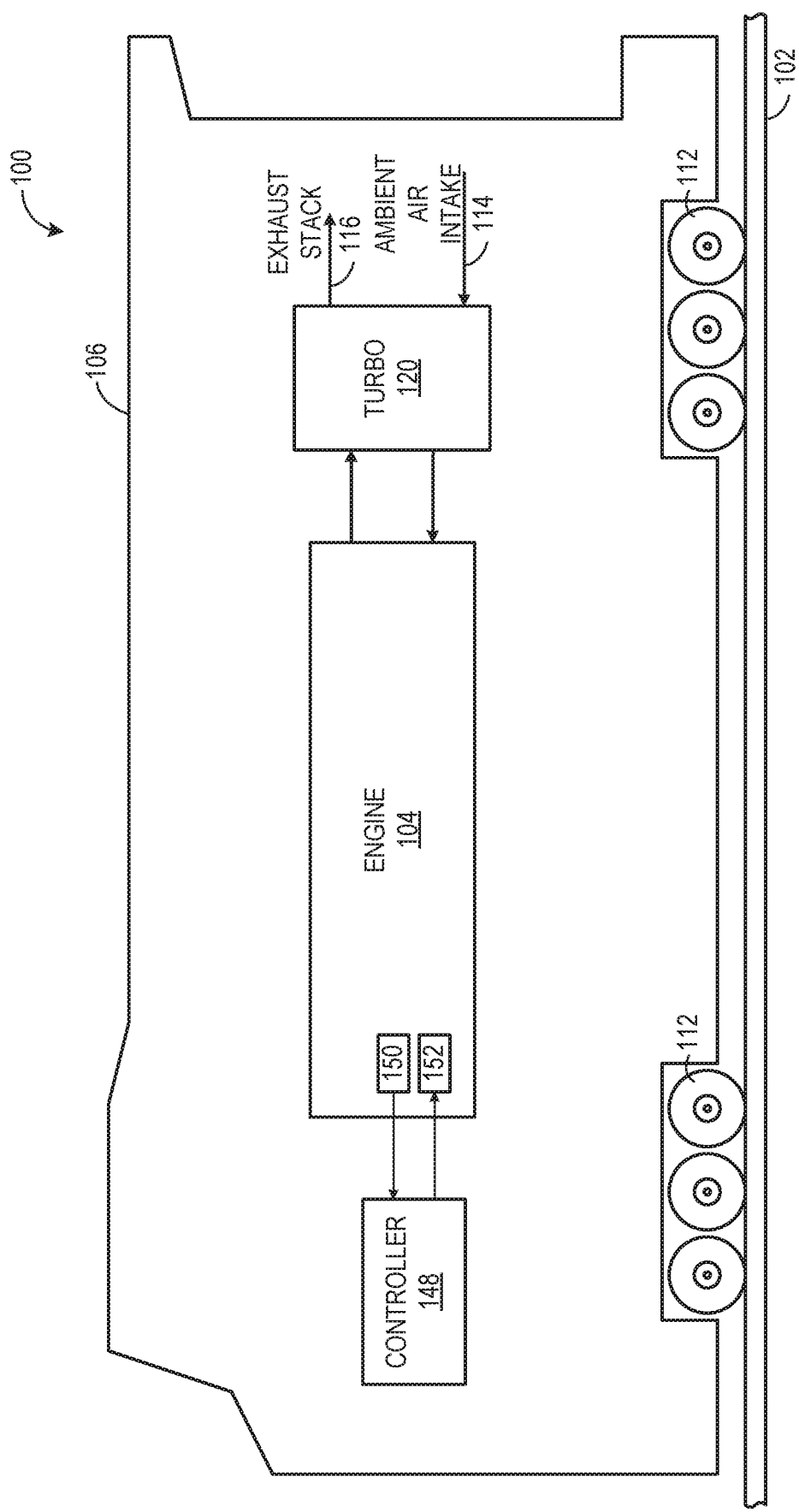
FIG. 1 shows a schematic diagram of a vehicle with an engine comprising a turbocharger arrangement, according to an embodiment.

The following description relates to embodiments of a radial turbocharger comprising a turbine case housing a turbine wheel and a compressor case housing a compressor wheel. The turbine case may be further equipped with a vaneless turbine nozzle integrated into the turbine case such that the turbine nozzle may be molded together as one piece with a remainder of the turbine case. A bearing case may be arranged between and in face-sharing contact with each of the turbine case and the compressor case, wherein the bearing case may surround a shaft connecting the turbine wheel to the compressor wheel.

A water jacket may be arranged in the bearing case such that the bearing case is water-cooled. The water jacket may include an annular portion surrounding a portion of the shaft and a plurality of extending portions, each extending portion extends outward from the annular portion relative to the shaft, and is spaced apart from adjacent extending portions of the plurality of extending portions, where outer ends of the extending portions are spaced away from an outer surface of the bearing case to create a supporting region for coupling the bearing case to an outer flange of the turbine case.

A plurality of bolts or other fasteners may be arranged around a circumference of the turbine case, wherein each long bolt (or other fastener) of the plurality of long bolts (or other fasteners) may extend parallel to the shaft from an outer face of compressor end of the bearing case, through the bearing case, and into the turbine case. In one example, the bolts or other fasteners may be considered as long bolts (or other fasteners) relative to a length of bolts (or other fasteners) used in previous examples of turbocharger, as elaborated below. The plurality of bolts (or other fasteners) may be adjacent to recesses formed between the plurality of extending portions of the water jacket. Said another way, each bolt (or other fastener) of the plurality of bolts (or other fasteners) may be positioned between a different pair of adjacent extending portions of the plurality of extending portions. The long bolts (or other fasteners) may increase a compliance of a turbocharger joint due to an ability of the long bolts (or other fasteners) to flex in response to stresses, which may maintain a pre-load set during a manufacturing process. Examples of other fasteners include threaded rods, screws, elongate pins, and so on. In one aspect, a turbocharger specifically includes bolts as described above/herein as the fastener, as a secure and easily actuatable fastening means.

To further address thermal loads of the turbine, the radial turbocharger may comprise a plurality of slots arranged around a circumference of the turbine case. A slot length of each slot may extend in a radial direction and be adapted to receive a dowel pin and/or rabbet pin so that each dowel pin may couple the bearing case to the turbine case. The dowel pins and slots may be arranged symmetrically such that the plurality of slots includes two sets of two slots arranged 180 degrees apart from one another, relative to a central axis of the turbocharger. Slot lengths of the plurality of slots may be oriented in a same direction such that a long axis of slots of a pair of slots are parallel. Slots of a first pair of slots may be arranged perpendicular to slots of a second pair. The distribution of the slots may allow for the turbine case to grow in the radial direction, as the turbine case heats up (due to a relatively large temperature gradient between the turbine case and bearing case), while constraining translational movement of the turbine case on the rabbet fit, normal to the radial direction. As a result, wear may be reduced due to reduction in relative motion in the direction normal to the radial direction and due to increased compliance in the radial direction.

In order to address thermal stresses induced in the turbocharger due to hot exhaust gases, turbochargers may be equipped with a heat shield. However, heat shields may increase packaging constraints and may be difficult to manufacture into the turbocharger. Additionally, the heat shield may interact with a joint between a turbine and bearing case or a corresponding bolted joint undesirably. For example, the heat shield may weaken couplings between the joints and corresponding components of the turbocharger. Smaller turbochargers may be free of heat shields due to reduced heat transfer. Additionally, due to a lower overall size of a smaller turbocharger compared to a larger turbocharger, force stresses placed on various supporting features of the smaller turbocharger may occur at a lesser extent, presenting fewer issues.

In one example, larger-frame turbochargers may comprise a turbine wheel larger than 150 mm. In another embodiment, larger-frame turbochargers may comprise a turbine wheel larger than 200 mm. As will become apparent based on the description below, a larger turbocharger may be free of the heat shield while maintaining a desired structural integrity and thermal gradient.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Before further discussion of the turbocharger casing embodiments, a platform in which the turbocharger may be installed is shown. FIG. 1 shows a block diagram of an embodiment of a vehicle system 100 (e.g., a locomotive system), herein depicted as vehicle 106. The illustrated vehicle is a rail vehicle (e.g., locomotive) configured to run on a rail 102 via a plurality of wheels 112. As depicted, the vehicle includes an engine system with an engine 104.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system includes a turbocharger 120 ("TURBO") that is arranged between the intake passage and the exhaust passage. The turbocharger increases pressure of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In one example, the turbocharger 120 may be a radial turbocharger comprises a diameter larger than a threshold (e.g., 200 mm) and may be used for stationary applications. The turbocharger is described in greater detail with reference to FIG. 2.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller 148 may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

Figure 2A:
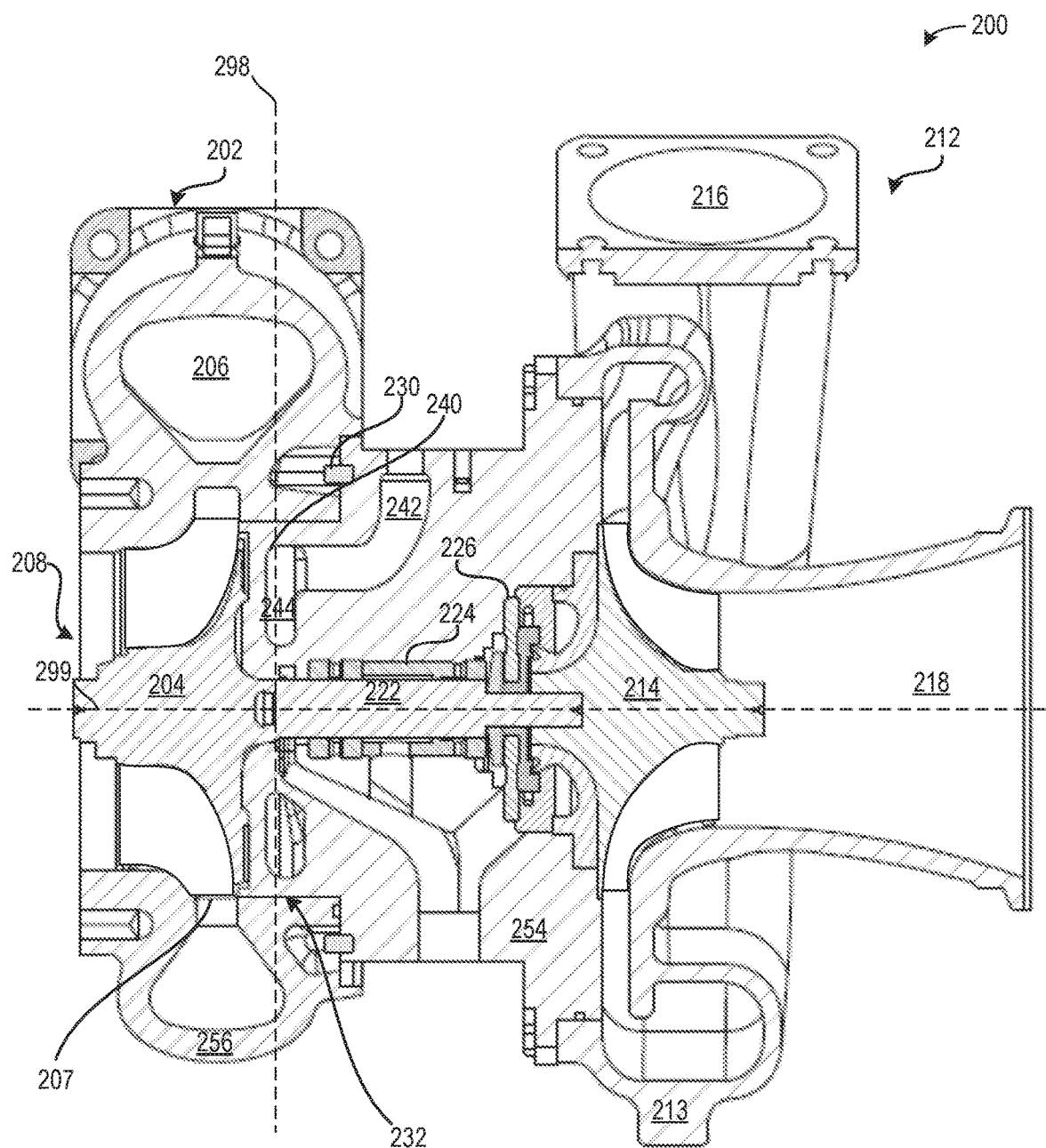
FIG. 2A shows a cross-section view of the turbocharger arrangement.

Turning now to FIG. 2A, it shows a partial, cross-sectional view of a turbocharger 200. The turbocharger may be used similarly to turbocharger 120 of FIG. 1 and may be included as the turbocharger 120 in the system of FIG. 1, in some embodiments. In one example, the turbocharger 200 is a radial turbocharger. The turbocharger may comprise a turbine 202 comprising a turbine case 256 which houses a turbine wheel 204 and a compressor 212 comprising a compressor case 213 which houses a compressor wheel 214.

The turbine wheel 204 may be mechanically (e.g., rotationally) coupled to the compressor wheel 214 via a shaft 222 extending parallel to a central axis 299 of the turbocharger. Exhaust gases may enter the turbine through a turbine inlet 206 (e.g., via a volute) and exit the turbine via a turbine outlet 208. Prior to exiting the turbine case, the exhaust gases may rotate the turbine wheel, the energy of which may be transferred along the shaft and to the compressor wheel. The compressor wheel may compress intake air entering the compressor via a compressor inlet 218, diffuser and volute such that compressed air exits the compressor via a compressor outlet 216.

In the example of FIG. 2A, the turbine is a larger-frame turbine (e.g., relative to a smaller-frame turbine). In one example, the turbine wheel may comprise a diameter equal to or greater than 150 mm.

The turbine wheel may extend radially across the turbine case, the radial direction relative to and perpendicular to the central axis, to a nozzle 207, the nozzle formed in the turbine case as an exit from the volute to the turbine wheel. Additionally, the turbine wheel may extend inward, in an axial direction, along the central axis, past a turbine nozzle in the turbine case. The turbine nozzle may be vaneless (e.g., comprising no vanes) and molded (or otherwise formed, e.g., by additive manufacturing such as metal laser sintering) together as one piece with the remainder of the turbine case. In this way, the turbine nozzle may be integrated with a remainder of the turbine case such that the turbine nozzle is an integral part of the turbine case. The turbine case may comprise of a silicon molybdenum iron alloy in some examples.

A feature common to previous examples of larger-frame turbochargers may include a heat shield, which may be shaped and/or configured to mitigate heat transfer from the turbine to the bearing case. One location in which the heat shield may be arranged is behind the turbine wheel, between the wheel and the bearing case. Heat shields may be common on larger turbine wheels due to higher amounts of heat transfer from the turbine to the bearing case relative to smaller turbines.

Larger turbines may also be commonly equipped with vanes for compressing and directing exhaust gas flow rather than relying on a volute solely to accelerate and swirl the exhaust flow into the turbine, vaned nozzles may increase turbine efficiency, particularly at off-design operation and reduce volute size for exhaust high-expansion ratio applications. However, vaned nozzles may require a nozzle ring coupled to the turbine case. As a result, a joint between the turbine case and bearing case may be more complex and subject to degradation. Additionally, the vanes may increase a packaging size of the turbine, which may decrease a number of viable cooling options for the turbine. However, as will be described herein, omission of the vanes may allow the turbine to be arranged more closely to a cooling jacket arranged between the turbine and the compressor, the cooling jacket further configured to cool other components along with the turbine to increase a longevity and durability of the turbocharger.

The turbocharger of FIG. 2A is free of vanes and a heat shield. As will be made apparent herein, omission of the turbine heat shield may be possible by configuring the turbine to be a vaneless turbine. By doing this, the turbine nozzle may be integrated as one piece with a remainder of the turbine case which may decrease packaging constraints and other limitations present by arranging vanes in the turbine may be avoided. Furthermore, this integration may allow enhanced support of the turbine case and increased cooling, as described further below.

The turbocharger may comprise a bearing 224 arranged in a bearing case 254. The bearing may be shaped to allow the shaft to extend therethrough. The bearing may be further shaped to circumferentially surround at least a portion of the shaft. Lubricant may flow into the bearing so that the shaft may be lubricated as it rotates, thereby decreasing a mechanical wear experienced by the shaft. In one example, the bearing is a cartridge journal bearing which may comprise a tapered pad and/or tri-load configuration. Herein, the bearing is referred to as journal bearing.

The turbocharger may further comprise a thrust bearing 226 arranged in the bearing case, at an end of the shaft arranged adjacent to the compressor wheel. Thus, the thrust bearing may be arranged between the journal bearing and the compressor wheel, along the central axis. The thrust bearing may be shaped to support an axial load while also providing lubrication to an interface between the shaft and the compressor wheel. The thrust bearing may be arranged outside of the journal bearing, adjacent to a compressor end of the bearing case (e.g., closer to the compressor case than the turbine case). In some examples, the thrust bearing may at least partially surround a portion of the journal bearing.

As shown in FIG. 2A, the bearing case is arranged between the turbine case and the compressor case. More specifically, the bearing case may be in face-sharing contact with each of the turbine case and the compressor case. The bearing case surrounds the shaft connecting the turbine wheel to the compressor wheel. The bearing case may be a water-cooled bearing case, as shown in FIG. 2A, comprising a water jacket 240 at least partially surrounding the shaft, wherein the water jacket comprises a plurality of extending portions 242 extending radially outward from an annular portion 244, relative to the shaft and/or central axis of the turbocharger. The extending portions may be spaced apart from one another around a circumference of the annular portion, as shown in FIG. 5, described further below. The extending portions may be spaced away from an outer diameter of the bearing case, so that extra material of the bearing case may be generated to support the turbine case and other materials of the turbocharger, such as additional material 420 of FIG. 4.

The water jacket may be biased toward the turbine case while being arranged in the bearing case. Said another way, the water jacket is arranged within the bearing case, closer to the turbine case than the compressor case. In one example, a portion of the water jacket nearest the turbine extends into a region of the bearing case aligned along axis 298, perpendicular to the central axis, within a region between the turbine wheel and the journal bearing. This may be achieved due to the turbine being vaneless and free of a turbine nozzle ring (e.g., turbine nozzle integrally formed in the turbine case by walls of the turbine case). More specifically, a turbine nozzle including turbine vanes may couple (e.g., clamp) to a turbine-bearing case joint and/or flange interface, which may result in an increased packaging size of the turbine and a reduced cooling effect provided from the water jacket to the turbine case. In the example of FIG. 2A, the water jacket is arranged adjacent to the turbine case since the turbine nozzle is integrally formed with the turbine case (and thus there is no nozzle ring) and the turbine is free of the heat shield. Since there is a larger thermal gradient between the turbine case and bearing case, created by the water-cooled (via the water jacket) bearing case and non-cooled turbine case coupled to one another, slippage between parts in the turbine case-bearing case joint (e.g., where they are coupled to one another) may occur. However, by reducing the number of components at this joint, as done in the turbocharger shown in FIG. 2A by not having a nozzle ring and heat shield (parts in addition to the turbine case and bearing case), a number of slippage interfaces between the parts is reduced.

As shown in the embodiment of FIG. 2A and as will be described in greater detail with respect to FIG. 3 and its corresponding description, the turbocharger may comprise a rabbet pin 230 and/or dowel pin 230. The rabbet pin, via a corresponding slot, may couple the turbine case to the bearing case while allowing the turbine case to expand in a desired direction (e.g., due to thermal expansion). More specifically, the rabbet pin may supplement a rabbet fit 232 to the turbine case, as described below.

Figure 2B:
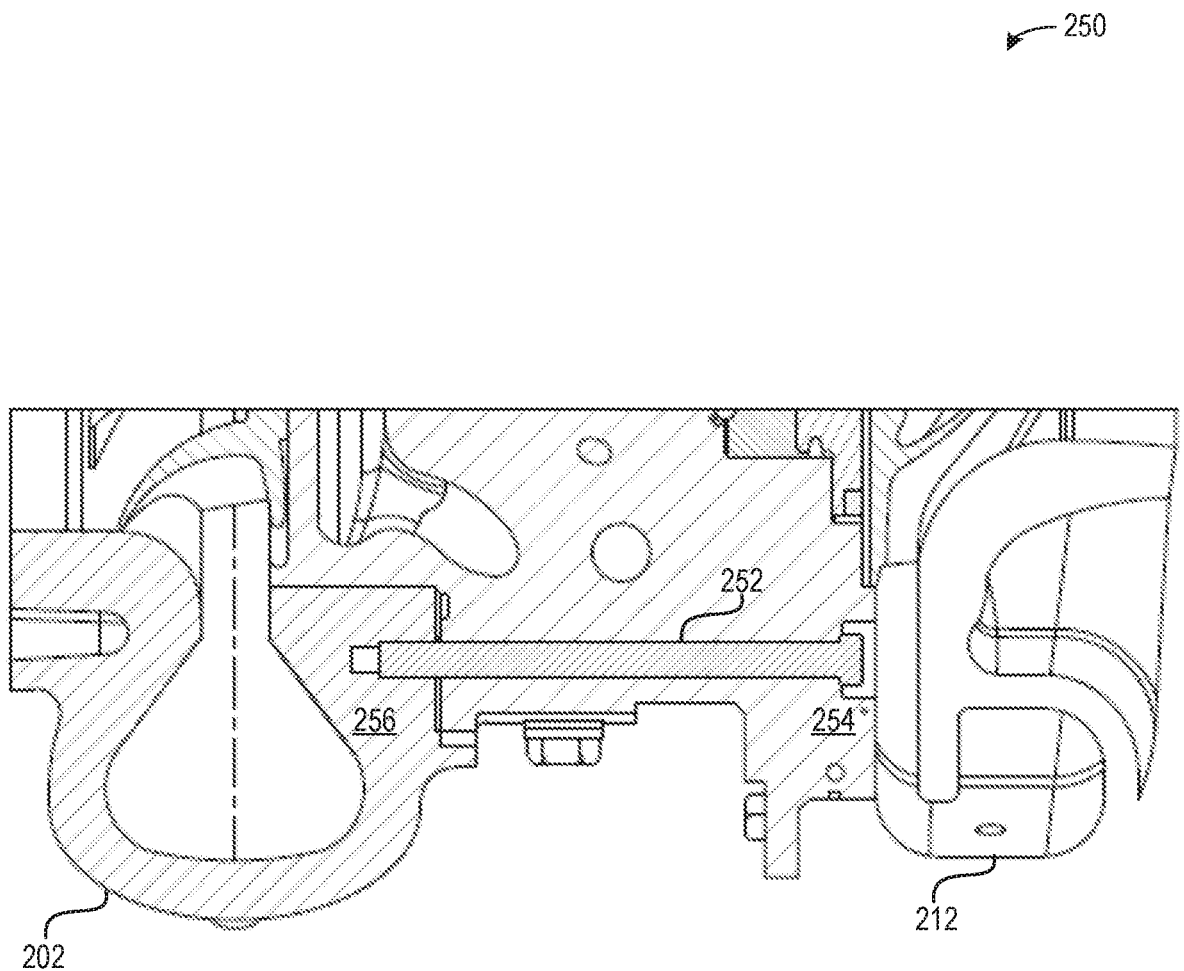
FIG. 2B shows a further cross-section view of the turbocharger arrangement.

Turning now to FIG. 2B, it shows a cross-sectional view 250 of a portion of the turbocharger 200. The cross-sectional view of FIG. 2B may differ from that of FIG. 2A in that a bolt 252 is revealed (e.g., the view of FIG. 2B is taken at a different cross-section than that of FIG. 2A).

The bolt may be elongated relative to previously used bolts. Previous examples of bolts may be shorter due to packaging limitations and/or the desire for variable clocking of the turbine case. The bolt of the example of FIG. 2B may be lengthened to extend from the compressor flange side of the bearing case into the turbine case. This may be accomplished due to the turbine being vaneless and design of the bearing case and the water jacket (e.g., water jacket 240 of FIG. 2A) providing packaging space for the bolt.

The bolt may be long enough to extend, in a direction of the central axis, from an outer face of a first end of the bearing case, the first end coupled to the compressor case, through an entirety of the bearing case, to a second end of the bearing case, and into the turbine case. The outer face of the first end of the bearing case includes a depression for receiving a head of the bolt and which is positioned against the compressor case. The bolt may be lengthened compared to previous examples, thereby increasing the compliance to the bolted joint. By increasing the compliance of the long bolted joint, the turbocharger may be less sensitive to changes in stretch and maintain a preload.

Figure 3:
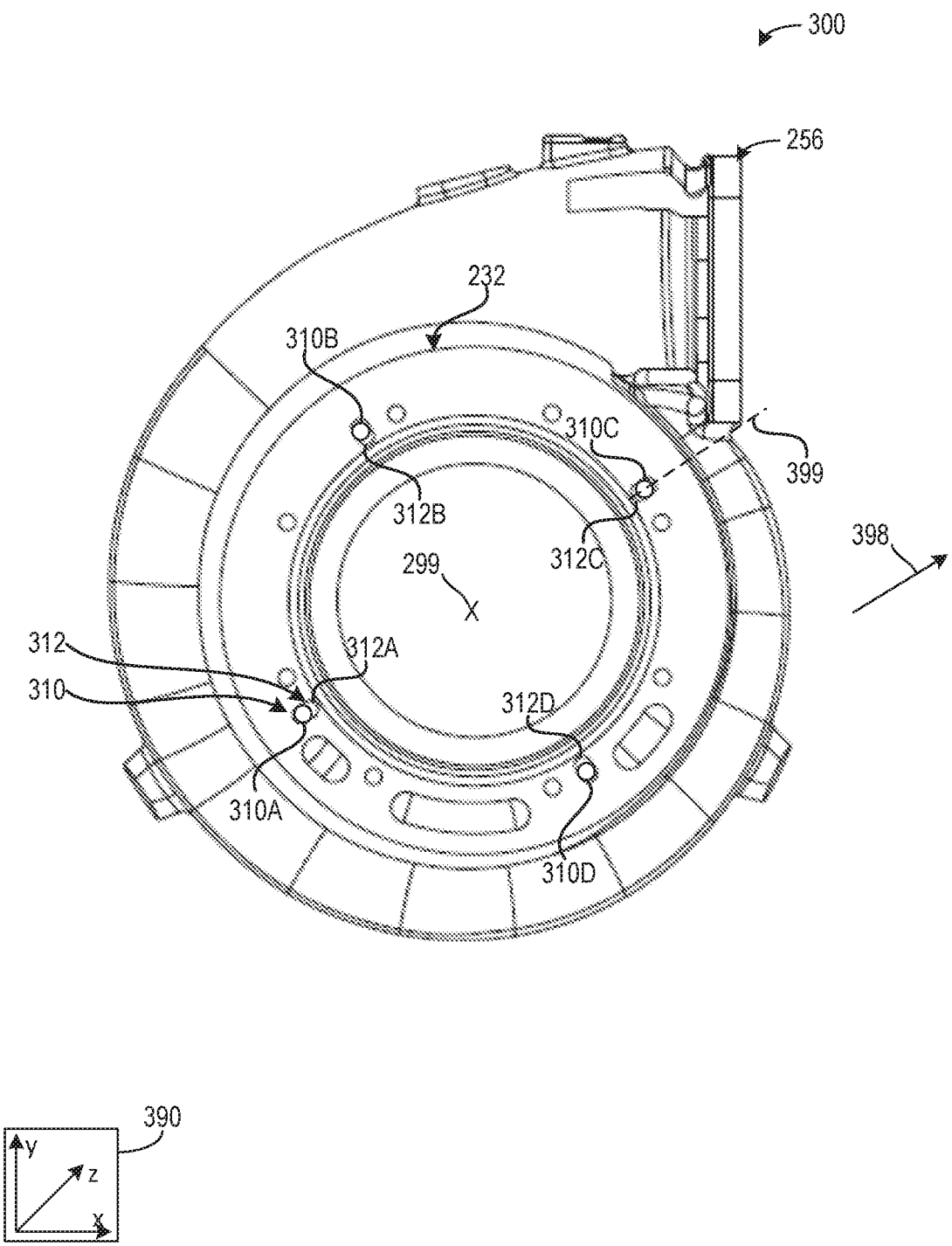
FIG. 3 shows a turbine case comprising a plurality of rabbet pins and slots.

Turning now to FIG. 3, it shows an embodiment 300 illustrating a pinned rabbet fit for the turbine case 256. Each of a plurality of rabbet pins 310 and/or dowel pins used to engage the turbine case may be similar to rabbet pin 230 of FIG. 2A, in one example.

An axis system 390 may comprise three axes, namely an x-axis parallel to a horizontal direction, a y-axis parallel to a vertical direction, and a z-axis perpendicular to each of the x- and y-axes. A radial direction of the turbine case may lie within a plane formed in the x- and y-axes. The shaft (e.g., shaft 222 of FIG. 2A) may be parallel to the z-axis and the central axis 299.

Each of the rabbet pins may be arranged in a corresponding slot of a plurality of slots 312 of the rabbet fit 232. The rabbet fit may comprise a ring shape such that a shaft or other turbocharger component may extend through an opening arranged in the rabbet fit and enter the turbine. In one example, a portion of the cooling jacket may extend through the opening of the rabbet fit, thereby increasing a proximity, and therefore cooling, of the cooling jacket to the turbine.

A first rabbet pin 310A may engage a first slot 312A. A second rabbet pin 310B may engage a second slot 312B. A third rabbet pin 310C may engage a third slot 312C. A fourth rabbet pin 310D may engage a fourth slot 312D. Each of the rabbet pins and slots may be similarly shaped and sized. In some embodiments, additionally or alternatively, one or more of the rabbet pins and corresponding slots may be differently shaped based on a desired expansion shape of the turbine case.

The rabbet pins and slots may be shaped to allow the rabbet pin to move along a long axis 399 of a corresponding slot, wherein the long axis is parallel to a radial direction 398 in the x-y plane. The radial direction is merely one example of a radial direction of a plurality of radial directions. However, portions of the rabbet pin arranged outside of a plane of the slot may comprise diameters substantially equal to a diameter of the corresponding slot, such that movement normal to the long axis may be blocked, such that the diameters are within 5% or less of one another. Additionally, these thicker portions of the rabbet pin may engage the corresponding slot to physically couple the turbine case to the bearing case.

In the example of FIG. 3, the rabbet pins may be arranged symmetrically about the turbine case (e.g., symmetrically around a circumference of the turbine case, relative to the central axis). In this way, an angle between each of the rabbet pins, measured from the central axis, may be substantially equal to 90 degrees. In this way, a translation of the turbine case in the radial direction (e.g., in a direction perpendicular to the z-axis and parallel to the x-y plane and normal to the central axis) may be limited. Said another way, the plurality of slots may be arranged in pairs arranged 180 degrees apart from one another, wherein a first pair of slots is arranged perpendicularly to a second pair of slots. A length of the slots measured along the long axis of a slot may be greater than a diameter of a rabbet pin such that the rabbet pin may move along the long axis, but not along the short axis.

More specifically, the rabbet pins may comprise a groove, a collar, an annular recess, or other cutout that may engage with the sides of the slots so as to have a tight fit with a corresponding slot. That is to say, a diameter of the rabbet pins may be decreased in one location, wherein the decreased diameter corresponds to a width of a corresponding slot measured along a short axis perpendicular to the long axis. As such, the turbine case may be permitted to expand in a radial direction parallel to the long axis of each slot, while being blocked from translating in directions normal to the radial direction. The turbine case may expand as it warms up, causing the rabbet fit between the turbine case and bearing case to open up and no longer block translation of the turbine case. The pinned rabbet allows the turbine case to expand in the radial direction via the rabbet pins but preventing translation. By doing this, total slip distance of the joints is reduced by the amount of additional motion that would be allowed by the gap in the turbine to bearing case rabbet fit. This may result in wear of joints of the turbocharger being reduced, which may increase durability of joints relative to previous examples of turbochargers. Additionally, by mitigating translation of the turbine case in a direction normal to the radial direction, required radial clearance between the turbine wheel blades and the turbine case as assembled to prevent contact during operation can be reduced resulting in improved turbine efficiency.

In one example of FIG. 3, the diameter of each dowel pin is sized to engage with opposing sides of the corresponding slot, the sides arranged in a direction of the slot length of the corresponding slot. the plurality of slots includes two sets of two slots arranged 180 degrees apart from one another, relative to a central axis of the turbocharger, and with slot lengths oriented in a same direction, where a first set of two slots is arranged perpendicular to a second set of two slots.

In this way, the examples of FIGS. 2A, 2B, and 3 show a radial turbocharger comprising a turbine case housing a turbine wheel and a compressor case housing a compressor wheel, the turbine case including a vaneless turbine nozzle integrated into the turbine case. A bearing case may at least partially surround a shaft connecting the turbine wheel to the compressor wheel. The bearing case being arranged between the turbine and compressor cases.

A plurality of long bolts may be arranged around a circumference of the turbine case, each long bolt of the plurality of long bolts may extend parallel to the shaft and from an outer face of a compressor end of the bearing case, through the bearing case, and into the turbine case.

A plurality of slots may be arranged around a circumference of the turbine case, a slot length of each slot may extend in a radial direction and be adapted to receive a dowel pin having a diameter smaller than the slot length, where each dowel pin, via a corresponding slot, couples the bearing case to the turbine case.

The bearing case may be water-cooled and include a water jacket positioned therein. The water jacket may include an annular portion surrounding a portion of the shaft and a plurality of extending portions, each extending outward from the annular portion, relative to the shaft, and spaced apart from adjacent extending portions of the plurality of extending portions, where outer ends of the extending portions are spaced apart from an outer surface of the bearing case to create a supporting region for coupling the bearing case to an outer flange of the turbine case.

Figure 4:
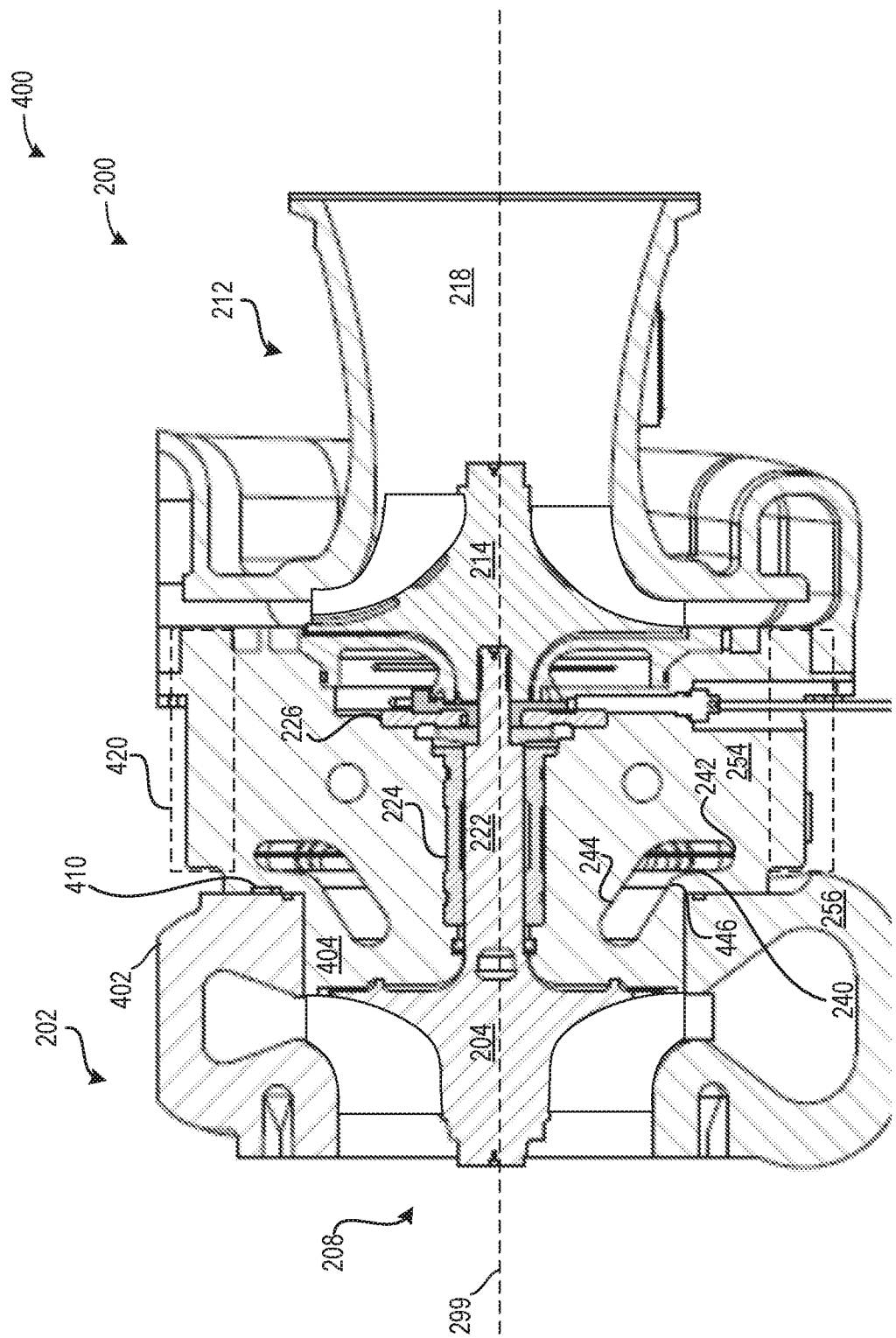
FIG. 4 shows an additional cross-section view of the turbocharger arrangement.
Figure 5:
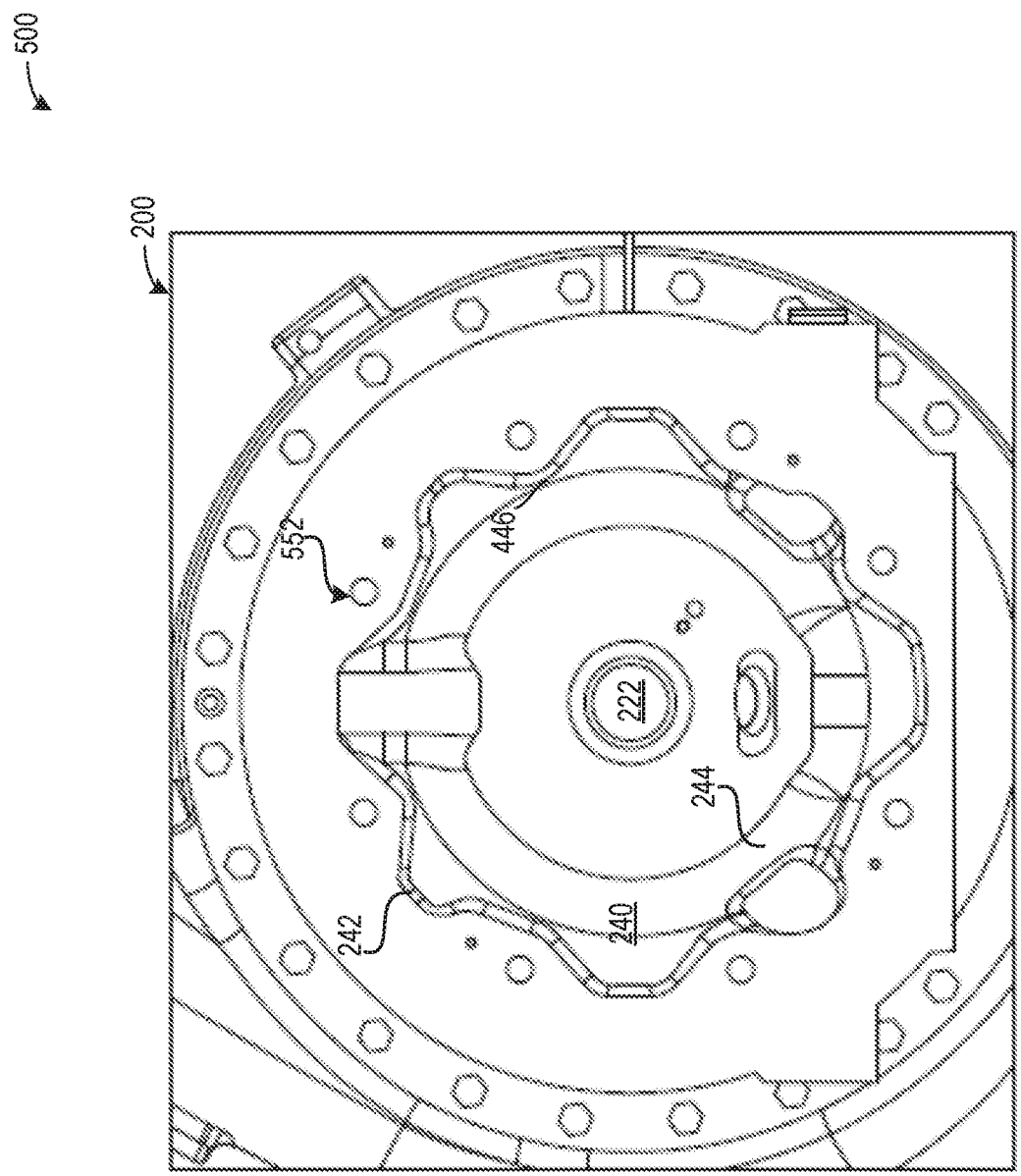
FIG. 5 shows a detailed view of a water jacket of the turbocharger arrangement.

Turning now to FIG. 4, it shows a cross-sectional view 400 of turbocharger 200, which may be similar to the cross-sectional view of FIG. 2A, except that the example of FIG. 4 illustrates features of the turbocharger not shown in FIG. 2A. As such, components previously introduced may be similarly numbered in this figure and subsequent figures.

The turbine case may comprise a first flange 402 in physical, face-sharing contact with a second flange 404 of the bearing case. The first flange may be annular and integrally formed with the turbine case, wherein the first flange may extend into the bearing case, toward the compressor. The first flange may be arranged at a position that is radially outward, relative to the shaft, the turbine wheel, and the annular portion of the water jacket. The first flange may further extend axially between the turbine nozzle and the plurality of extending portions of the water jacket.

A groove 410 may be arranged in the bearing case between, in a direction of the central axis, the turbine case and the water jacket in the first flange. The groove may be shaped to reduce a contact area between the turbine case and the bearing case. This may decrease heat transfer from the turbine to the shaft and the compressor, thereby providing thermal relief. The groove may extend at least partially around a circumference of the bearing case. In some examples, the groove is continuous and extends around an entire circumference of the bearing case. In other examples, additionally or alternatively, the groove may be a plurality of discontinuous grooves spaced apart one another along a single circumference of the bearing case. A size of the groove may be adjusted based on a size of the turbocharger and the water jacket. In one example, the size of the groove may be decreased if the size of the water jacket is increased. As another examples, the size of the groove may be increased as the size of the turbocharger is increased. The groove may be sized to achieve a desired temperature gradient across the turbocharger such that overheating of components between the turbine and the compressor is blocked. In one example, the groove is a thermal relief groove depressed into a portion of a face of the bearing case that has face-sharing contact with the turbine case, the thermal relief groove arranged adjacent to one extending portion of the plurality of extending portions and wherein the turbine case is not cooled.

The first flange may further comprise the plurality of slots (e.g., slots 312 of FIG. 3) arranged around a circumference of the turbocharger. The plurality of slots may be arranged between the first flange and the second flange, each of the slots adapted to receive a dowel pin and/or rabbet pin (e.g., rabbet pins 310 of FIG. 3) coupling the first flange to the second flange. In this way, the groove and/or grooves may be arranged proximally to the plurality of slots while still being spaced apart from the plurality of slots.

To further decrease thermal stress due to the relatively larger thermal gradient between the non-cooled turbine case and water-cooled bearing case, the bearing case may comprise additional material in the second flange, which may be arranged along an outer diameter of the bearing case and within an area indicated by dashed boxes 420. The additional material may provide additional structural support of the flange as well as function as a further heat sink, where heat transferred from the turbine case to the bearing case may heat the additional material and result in a lower temperature of other components of the turbocharger. In one example, the additional material may comprise a material similar to the material of the bearing case, such as cast iron. In this way, the bearing case may comprise an outer diameter that extends beyond a radial position of the turbine nozzle, and where the additional material of the bearing case forming the second flange is arranged between the outer diameter of the bearing case and ends of the plurality of extending portions of the water jacket. The second flange may be adapted to support the first flange of the turbine case.

As described above, the turbine casing also comprises additional material, wherein the turbine casing is thickened in a plane of the turbine wheel. This in combination with the additional material of the bearing case may further decrease heat transfer from the turbine to other components of the turbocharger. Additionally or alternatively, thickening the turbine casing may contain a turbine wheel and/or fragments thereof in the event of a turbine wheel degradation, such that fragments do not infiltrate other portions of the turbocharger to cause further degradation.

The water jacket 240 may comprise a bent shape. In the example of FIG. 4, the water jacket comprises a boomerang shape, wherein the water jacket arcs radially outward, relative to the central axis, from a region of the water jacket arranged adjacent to the turbine. As shown in FIGS. 4 and 5, the annular portion 244 may extend in a direction angled to each of the central axis and the radial direction from a position proximal to the turbine case to a position distal to the turbine case. The water jacket 240 may further comprise the plurality of extending portions 242, which may extend from the annular portion 244 at a portion of the annular portion 244 furthest away from the turbine case. A transition 446 between the annular portion 244 and the plurality of extending portions 242 may be smooth and flush so that concentrations of stress load may be more evenly distributed.

The shape of the water jacket may be optimized to increase cooling as heat in the bearing case is directed away from the shaft and other moving components of the turbocharger and into the water jacket. Additionally, the shape of the water jacket may provide a sufficient amount of space for material of the bearing case to support the turbine flange. This may decrease a load on bolts and other coupling devices of the turbocharger. The water jacket will be described in greater detail below.

Turning now to FIG. 5, it shows an embodiment 500 of the water jacket 230 of FIGS. 2A and 4. The water jacket may be arranged between the first flange of the turbine and the second flange of the bearing case. More specifically, the water jacket may be biased toward the turbine such that the water jacket is proximal to first flange of the turbine and distal to the second flange of the bearing case.

The water jacket may comprise a shape based on an arrangement of bolts 552. In one example, a bolt of the bolts may be similar to bolt 252 of FIG. 2B. In the example of FIG. 5, there are exactly eight bolts. The plurality of bolts includes eight long bolts spaced apart from one another around a circumference of the turbine case. However, other numbers of bolts may be used without departing from the scope of the present disclosure. In the example of FIG. 5, the water jacket 240 comprises an eight-point star shape, wherein the points of the water jacket correspond to the plurality of extending portions 242 of the water jacket. The plurality of extending portions extends radially outward from the annular portion 244 of the water jacket, each extending portion arranged between two adjacent bolts. Said another way, each bolt of the plurality of bolts may be positioned between a different pair of adjacent extending portions of the plurality of extending portions.

As such, the water jacket may extend radially inward at portions of the water jacket adjacent to a bolt of the bolts, which may correspond to the annular portion of the water jacket. In some examples, additionally or alternatively, the water jacket may comprise a flower shape or other similar shape to accommodate bolts holes for the bolts to pass through.

An interior surface of the water jacket may be smooth and may correspond to a transition between the extending portions and the annular portion. "Smooth" meaning that the interior surface may be free of protrusions, bumps, recesses, and the like. Said another way, the water jacket further includes smooth, curved transitions between each extending portion of the plurality of extending portions and the annular portion. By shaping the interior surface to be smooth, concentrations of a stress load may be spread out more evenly while allowing the water jacket to comprise extending portions, which may provide greater cooling. This may decrease stress on the bolts and other features of the turbocharger.

In an embodiment, a turbocharger (e.g., radial turbocharger) includes a turbine case housing a turbine wheel and a compressor case housing a compressor wheel. The turbine case includes a vaneless turbine nozzle integrated into the turbine case. The turbocharger also includes a bearing case surrounding a shaft connecting the turbine wheel to the compressor wheel and arranged between the turbine case and compressor case. The turbocharger also includes a plurality of fasteners (e.g., bolts) arranged around a circumference of the turbine case; each fastener of the plurality of fasteners extends parallel to the shaft and from an outer face of a compressor end of the bearing case, through the bearing case, and into the turbine case. The turbocharger may be part of an engine system, such as an engine system for a stationary application (e.g., generator) or an engine system for a locomotive, other rail vehicle, or other vehicle.

In an embodiment, a turbocharger (e.g., radial turbocharger) includes a turbine case housing a turbine wheel and a compressor case housing a compressor wheel. The turbine case includes a vaneless turbine nozzle integrated together as one piece with a remainder of the turbine case. The turbocharger also includes a water-cooled bearing case surrounding a shaft connecting the turbine wheel to the compressor wheel and arranged between and in face-sharing contact with each of the turbine case and compressor case. The water-cooled bearing case includes a water jacket surrounding the shaft. The water jacket includes an annular portion and a plurality of extending portions extending radially outward from the annular portion, relative to the shaft, and spaced apart from one another around a circumference of the annular portion. The turbocharger also includes a plurality of fasteners (e.g., bolts) arranged around a circumference of the turbine case; each fastener of the plurality of fasteners extends parallel to the shaft and from an outer face of a compressor end of the bearing case, through the bearing case, outside of the annular portion of the water jacket, and into the turbine case. Also, each fastener is positioned between a different pair of adjacent extending portions of the water jacket. The turbocharger may be part of an engine system, such as an engine system for a stationary application (e.g., generator) or an engine system for a locomotive, other rail vehicle, or other vehicle.

In an embodiment, a turbocharger (e.g., radial turbocharger) includes a turbine case housing a turbine wheel and a compressor case housing a compressor wheel. The turbine case may be non-actively cooled, meaning cooled only through thermal conductivity with contacting parts or natural air convection, and not through water cooling or other forced convection. The turbocharger also includes a water-cooled bearing case surrounding a shaft connecting the turbine wheel to the compressor wheel and arranged between the turbine case and compressor case. The turbocharger also includes a plurality of slots arranged around a circumference of the turbine case. Each slot includes a slot length and a slot diameter, the slot length longer than the slot diameter. The plurality of slots includes four slots positioned 90 degrees apart from one another around a circumference of the turbine case, where the slot length of each slot is arranged in a radial direction relative to the shaft. The turbocharger also includes a plurality of dowel pins. Each dowel pin is positioned within a corresponding slot and couples a first flange of the turbine case to a second flange of the bearing case. Each dowel pin has a diameter smaller than the slot length and sized to fit with the slot diameter of the corresponding slot (e.g., the dowel pin may have a diameter that is the same as, or just slightly smaller (e.g., 1% smaller) than the slot diameter).

The technical effect of a radial turbocharger for a locomotive comprising a cooled bearing case supporting a turbine case for a turbine including a vaneless turbine nozzle is to decrease thermal load and stress concentrations in a turbocharger via omission of a turbine nozzle including vanes and a heat shield and incorporation of a water jacket in the bearing case of the turbocharger. By foregoing these components, a flange of the turbine case may be thickened, while allowing a second flange of a bearing case to be optimally shaped to support the turbine case flange. Additionally, by eliminating additional components (e.g., the turbine nozzle ring, heat shield, and additional shorter bolts), a coupling joint between the turbine case and bearing case may be made more robust. By including a plurality of longer bolts coupling the turbine case and bearing case, all the way through the bearing case, a compliance of the bolted joints may be increased, further reducing degradation of the turbine case-bearing case joint. Furthermore, additional space may be provided for a thermal groove, the water jacket, and bolts to extend between the bearing case and the turbine case. All of these features, combined together, provide for a turbocharger case having reduced thermal stress, reduced stresses on joints between components, and increased load strength.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbocharger, comprising:
a turbine case housing a turbine wheel and a compressor case housing a compressor wheel, the turbine case including a vaneless turbine nozzle integrated into the turbine case and the turbine case including a first flange;
a bearing case surrounding a shaft connecting the turbine wheel to the compressor wheel and arranged between the turbine case and compressor case, the bearing case including a second flange, wherein the first flange and the second flange have face-sharing contact with one another, wherein a thermal relief groove is depressed into a face of the second flange that has face-sharing contact with the first flange; and
a plurality of fasteners arranged around a circumference of the turbine case, each fastener of the plurality of fasteners extending parallel to the shaft and from an outer face of a compressor end of the bearing case, through the bearing case, and into the turbine case; and
a water jacket surrounding the shaft and extending into a portion of the second flange.

2. The turbocharger of claim 1, wherein the bearing case is water-cooled via the water jacket, the water jacket including a plurality of extending portions, each extending outward from the annular portion, relative to the shaft, and spaced apart from adjacent extending portions of the plurality of extending portions, where outer ends of the extending portions are spaced apart from an outer surface of the bearing case to create a supporting region for coupling the bearing case to the first flange of the turbine case.

3. The turbocharger of claim 2, wherein each fastener of the plurality of fasteners is positioned between a different pair of adjacent extending portions of the plurality of extending portions and wherein the water jacket further includes smooth, curved transitions between each extending portion of the plurality of extending portions and the annular portion.

4. The turbocharger of claim 2, wherein the thermal relief groove is arranged adjacent to one extending portion of the plurality of extending portions, and wherein the turbine case is not actively cooled.

5. The turbocharger of claim 1, wherein the turbine wheel extends radially across the turbine case, to the nozzle, and extends inward, in an axial direction, past the nozzle.

6. The turbocharger of claim 1, wherein the turbine nozzle is molded together as one piece with a remainder of the turbine case.

7. The turbocharger of claim 1, wherein the bearing case includes a cartridge journal bearing surrounding a central-portion of the shaft and a thrust bearing surrounding another portion of the shaft arranged outside the journal bearing, relative to an axial direction, on a compressor-side of the shaft.

8. The turbocharger of claim 1, further comprising a plurality of slots arranged around a circumference of the turbine case, a slot length of each slot extending in a radial direction and adapted to receive a dowel pin having a diameter smaller than the slot length, where each dowel pin, via a corresponding slot, couples the bearing case to the turbine case.

9. The turbocharger of claim 8, wherein the diameter of each dowel pin is sized to engage with opposing sides of the corresponding slot, the sides arranged in a direction of the slot length of the corresponding slot.

10. The turbocharger of claim 8, wherein the plurality of slots includes two sets of two slots with slot lengths oriented in a same direction.

11. A turbocharger, comprising:
a turbine case housing a turbine wheel and a compressor case housing a compressor wheel of a compressor, the turbine case including a vaneless turbine nozzle integrated together as one piece with a remainder of the turbine case, wherein the turbine case includes a first flange;
a water-cooled bearing case surrounding a shaft connecting the turbine wheel to the compressor wheel and arranged between and in face-sharing contact with each of the turbine case and compressor case, the water-cooled bearing case including a water jacket surrounding the shaft, the water jacket including an annular portion and a plurality of extending portions extending radially outward from the annular portion, relative to the shaft, and spaced apart from one another around a circumference of the annular portion, wherein the water-cooled bearing case includes a second flange, wherein the first flange and the second flange have face-sharing contact with one another, wherein a thermal relief groove is depressed into a face of the second flange that has face-sharing contact with the first flange, and wherein the water jacket extends into a portion of the second flange; and a plurality of fasteners arranged around a circumference of the turbine case, each fastener of the plurality of fasteners extending parallel to the shaft and from an outer face of a compressor end of the bearing case, through the bearing case, outside of the annular portion of the water jacket, and into the turbine case, where each fastener is positioned between a different pair of adjacent extending portions of the water jacket.

12. The turbocharger of claim 11, wherein the bearing case extends between the turbine wheel and compressor wheel and wherein first flange of the turbine case is an annular flange extending into the bearing case, toward the compressor, the first flange arranged at a position that is radially outward, relative to the shaft, of the turbine wheel and the annular portion of the water jacket, and axially between the turbine nozzle and plurality of extending portions of the water jacket.

13. The turbocharger of claim 12, wherein the bearing case has an outer diameter that extends past a radial position of the turbine nozzle and wherein additional material of the bearing case, forming the second flange, is arranged between the outer diameter and ends of the plurality of extending portions of the water jacket, the second flange adapted to support the first flange of the turbine case.

14. The turbocharger of claim 13, further comprising a plurality of pinned slot connections arranged around a circumference of the turbocharger, between the first flange of the turbine case and the second flange of the bearing case, where the first flange includes a plurality of spaced apart slots, each adapted to receive a pin coupling the second flange to the first flange.

15. The turbocharger of claim 14, wherein the thermal relief groove is spaced apart from an adjacent pinned slot connection, the thermal relief groove positioned proximate to an extending portion of the plurality of extending portions, and wherein the turbine case is not actively cooled.

16. The turbocharger of claim 15, wherein each fastener of the plurality of fasteners extends into the first flange of the turbine case and wherein each of the plurality of fasteners, pinned slot connections, and extending portions are arranged at a same radial position around the circumference of the turbocharger.

17. The turbocharger of claim 11, wherein a thickness of the turbine case is thicker in a region surrounding the turbine wheel than a remainder of the turbine case.

18. A turbocharger, comprising:
a non-actively cooled turbine case housing a turbine wheel and a compressor case housing a compressor wheel;
a water-cooled bearing case surrounding a shaft connecting the turbine wheel to the compressor wheel and arranged between the turbine case and compressor case;
a plurality of slots arranged around a circumference of the turbine case, each slot including a slot length and a slot diameter, the slot length longer than the slot diameter, the plurality of slots including four slots positioned 90 degrees apart from one another around a circumference of the turbine case, where the slot length of each slot is arranged in a radial direction relative to the shaft; and
a plurality of dowel pins, each dowel pin positioned within a corresponding slot and coupling a first flange of the turbine case to a second flange of the bearing case, each dowel pin having a diameter smaller than the slot length and sized to have a tight fit with the slot diameter of the corresponding slot,
wherein the first flange and second flange have face-sharing contact with one another, wherein a thermal relief groove is depressed into a face of the second flange that has face-sharing contact with the first flange, and wherein the bearing case includes a water jacket surrounding the shaft and extending into a portion of the second flange arranged proximate to the first flange.

19. The turbocharger of claim 18, wherein the turbine case includes an integrated nozzle without any vanes.

* * * * *